United States Patent [19]

Morin

[11] Patent Number: 4,877,122
[45] Date of Patent: Oct. 31, 1989

[54] CONVEYOR BELT SCRAPERS

[76] Inventor: Normand Morin, P.O. Box 636, 80 Nickel Street, Levack, Ontario, Canada, P0M 2C0

[21] Appl. No.: 189,239

[22] Filed: May 2, 1988

[51] Int. Cl.$^4$ ................................................. B65G 45/00
[52] U.S. Cl. ............................................ 198/499; 198/497; 15/256.51
[58] Field of Search .............. 198/497, 499; 15/256.6, 15/256.51, 256.5

[56] References Cited

U.S. PATENT DOCUMENTS

| | | | |
|---|---|---|---|
| 2,545,882 | 3/1951 | Hall | 198/499 |
| 3,688,336 | 9/1972 | Costello, Jr. et al. | 15/256.51 |
| 3,722,465 | 3/1973 | Krautzberger | 118/123 |
| 3,803,665 | 4/1974 | Winterburn et al. | 15/256.51 |
| 3,913,728 | 10/1975 | Pott | 198/498 |
| 3,949,866 | 4/1976 | Pott | 198/499 |
| 4,036,351 | 7/1977 | Reiter | 198/499 |
| 4,105,109 | 8/1978 | Schultz | 198/499 |
| 4,131,194 | 12/1978 | Anderson | 198/499 |
| 4,202,437 | 5/1980 | Gordon | 198/497 |
| 4,257,517 | 3/1981 | MacPherson | 198/497 |
| 4,265,358 | 5/1981 | Veenhof | 198/499 |
| 4,269,301 | 5/1981 | Gibbs | 198/499 |
| 4,290,520 | 9/1981 | Rhodes | 198/499 |
| 4,328,888 | 5/1982 | Luke | 198/499 |
| 4,349,098 | 7/1982 | Veenhof | 198/497 |
| 4,367,120 | 1/1983 | Hendrikz | 15/256.51 X |
| 4,367,691 | 1/1983 | Bergs | 15/256.51 X |
| 4,489,823 | 12/1984 | Gordon | 198/499 |
| 4,520,917 | 6/1985 | Sillivent | 198/499 |
| 4,541,523 | 9/1985 | Stockton | 198/499 |
| 4,598,823 | 7/1986 | Swinderman | 198/499 |

FOREIGN PATENT DOCUMENTS

| | | | |
|---|---|---|---|
| 1051725 | 2/1959 | Fed. Rep. of Germany | 198/497 |
| 1239051 | 6/1986 | U.S.S.R. | 198/499 |

*Primary Examiner*—Robert J. Spar
*Assistant Examiner*—James R. Bidwell

[57] ABSTRACT

Particulate material from a conveyor belt may be removed by a conveyor belt scraper comprising a flexible wear element for bearing against the working surface of the conveyor belt and a housing shaped and dimensioned for dispensing one end of the wear element against the conveyor belt and for storing the rest of the wear element in the interior of the housing. The transverse dimensions of the interior of the housing are less than the length of the wear element. The housing is pressure-tight up to a given operating pressure when the wear element is within the housing. The housing is adapted to be filled by a fluid, such as a gas or liquid, which when compressed acts directly on the wear element within the housing to force the wear element against the conveyor belt and to maintain the wear element against the conveyor belt as the wear element wears.

20 Claims, 3 Drawing Sheets

CONVEYOR BELT SCRAPERS

This invention relates to conveyor belt scrapers.

BACKGROUND OF THE INVENTION

There are in existence a number of prior art devices for removing surface dirt from a factory conveyor belt. One type comprises a scraper element made of a block of rubber about a foot long and of a width conforming to the width of the conveyor belt, which is urged against the moving belt by a hinge and counter-weight arrangement. In another known type of conveyor scraper, the scraper blade is connected to an arm which is urged against the conveyor belt by a torque applying mechanism such as a spring steel arm or air cylinder. In another type of known device, the scraper blade is biased towards the conveyor belt by means of a coil spring. The wear elements of these conveyor scrapers are relatively short in length and tend to wear quickly. As a result, the wear element of these scrapers must be replaced on a relatively frequent basis, which entails high labour costs. Also, these prior art scraper designs are inefficient because a relatively high percentage of the total volumetric area of their scraper blades is unusable. In some cases, one inch of a five inch blade must be thrown away—this represents a 20% waste of material. All of these prior art scrapers therefore suffer from the common disadvantage of entailing high maintenance (parts and labour) costs.

The scraping apparatus disclosed in the U.S. Pat. No. 2,545,882, which issued to Hall on 20 Mar., 1951, addresses the problem of frequent replacement of the wear element, by providing a relatively long scraper strip mounted about a roller. However, this apparatus uses a cumbersome mechanical arrangement for maintaining the scraper strip in contact with the belt under tension. This unwieldy mechanism would seem to make the Hall scraper unsuitable for mounting in most conveyor chutes which have a limited space to accomodate a scraper unit. The Hall unit has not to the applicant's knowledge been exploited on a commercial basis.

The conveyor belt cleaning device disclosed in U.S. Pat. No. 4,290,520, which issued to Rhodes on 22 Sept., 1981, avoids the need for independent suspension springs or other mechanical adjustments of the mounting of the scraper blade, by utilising a pressurized air bag. However, the use of this design limits the length of the scraper blade, since the scraper unit must be compact in order to fit into the space provided in typical conveyor chutes. As a result, the Rhodes conveyor scraper also entails relatively high maintenance costs caused by relatively frequent service intervals as well as a high percentage of waste by volume of the wear element.

SUMMARY OF THE INVENTION

The applicant has found that the disadvantages of the prior art can be overcome by apparatus adapted to apply compressed air or other fluid directly onto a relatively lengthy wear element which is coiled or otherwise stored in a scraper housing. The apparatus of the present invention is compact, and contains no mechanical parts in its blade dispenser. It has the capability of dispensing a relatively long scraper element, which entails very little wastage. As a result, the scraper of the present invention is expected to significantly reduce maintenance costs (both parts and labour) as compared to known prior art scrapers. Additionally, the arrangement of the present invention functions to maintain a suitable pressure between the scraper wear element and the conveyor belt. Moreover, by varying the pressure inside the housing, optimum scraping/wear ratios can be obtained.

The present invention is directed to apparatus for removing particulate material from a conveyor belt, comprising a flexible wear element and a housing. The wear element bears against the working surface of a moving conveyor belt and removes particulate material therefrom. The housing is shaped and dimensioned for dispensing one end of the wear element against the conveyor belt and for storing the rest of the wear element within the interior of the housing. The transverse dimensions of the interior of the housing are less than the dimensions of the wear element. The housing is pressure-tight up to a given operating pressure, when the wear element is within the housing. The housing is adapted to be filled by a fluid (i.e. a gas such as air or a liquid such as water) which when compressed acts directly on the wear element within the housing to force the wear element against the conveyor belt and to maintain the wear element against the conveyor belt as the wear element wears The housing comprises dispensing means for dispensing one end of the wear element against the conveyor belt and a storage chamber configured to store the rest of the wear element within the interior of the housing, preferably in a coiled fashion. The dispensing means includes sealing means for pressure sealing the interface between the interior of the housing and the wear element so that the housing is substantially pressure-tight. The sealing means preferably takes the form of a floating double lip pressure seal.

BRIEF DESCRIPTION OF THE DRAWINGS

The invention is described herein, by way of example only, with reference to the accompanying drawings, in which.

DETAILED DESCRIPTION OF THE PREFERRED EMBODIMENTS

Figure 1:
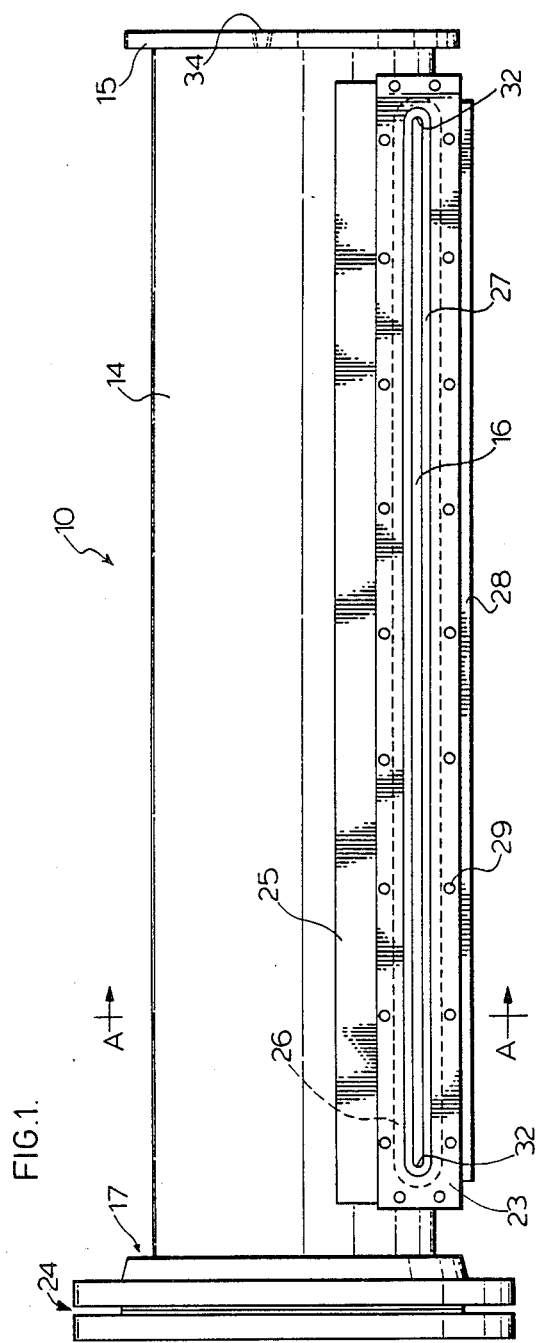
FIG. 1 is a top plan view of a preferred embodiment of the conveyor scraper of the present invention.
Figure 2:
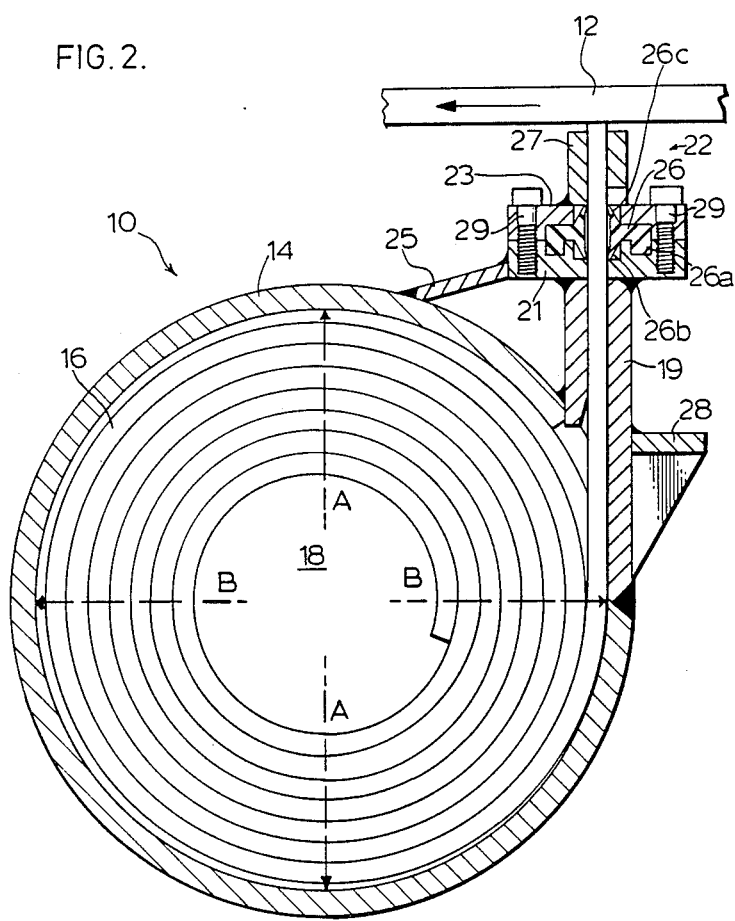
FIG. 2 is a sectional view of the conveyor scraper shown in FIG. 1, taken along line A—A.

Referring to FIGS. 1 and 2, conveyor scraper 10 comprises housing 14 and wear element 16. Housing 14 includes a storage chamber 18 and dispensing means 22. Wear element 16 is adapted to be stored in storage chamber 18 and dispensed through dispensing means 22. Housing 14 has a closed end 15 and an open end 17 which is adapted to be sealed in a pressure-tight fashion by access flange 24, which may take the form of a Victaulic (trademark) coupling. Storage chamber 18 is preferably made from a section of large diameter metal pipe of sufficient strength to withstand suitable operating pressures, which may range up to 100 psi or more.

Dispensing means 22 of housing 14 comprises a lower section 19 welded to storage portion 18, seal flange 21 welded onto the top of lower section 19 removable seal retainer plate 23, and top section 27. Lower section 19 has a slot therein for receiving wear element 16. Seal flange 21 includes a cavity for receiving pressure sealing means in the form of a lip seal 26 which seals off storage chamber 18 of housing 14 from the outside when wear element is within the slot of dispensing means 22. Seal retainer plate 23 includes a cavity for receiving lip seal 26, and is designed to be coupled to seal flange 21 by a plurality of cap screws 29. Top section 27 is welded onto the top of seal retainer 23, and is provided with a dispensing slot which is in alignment with the slot of lower section 19 when seal retainer 23 is screwed in place. Lip seal 26 is a continous seal which extends around the entire periphery of the dispensing slot. Lip seal 26 comprises a body portion 26a which is clamped securely between seal flange 21 and seal retainer 23, inside pressure sealing lip 26b and outside dust and water sealing lip 26c. Reinforcement members 25 and 28 provide dispensing means 22 with sufficient structural rigidity to prevent it from flexing when housing 14 is pressurized. Lip seal 26 is preferably made from polyurethane, but other materials, such as rubber, could be used.

Wear element 16 is a sheet of flexible material capable of being stored in the storage chamber 18 of housing 14, preferably in a coiled fashion. Wear element 16 is preferably made from a polyurethane, such as Thompson Gordon Thor-Flex 109H - A, which has been found to provide good scraping action without damage to the conveyor belt surface, and long wear life. As shown in FIG. 1, the edges 32 of wear element 16 have rounded corners which mate with the corners of lip seal 26 in a pressure-tight fashion. The dimensions of wear element 16 will vary, depending upon the application, but just to give one example, a $\frac{1}{4}$ inch thick polyurethane wear element having a width of 32 inches and a length of approximately 118 inches may be stored in a storage chamber having a diameter of 8 inches, and has been found to be suitable for a number of conveyor applications.

Closed end 15 of housing 14 is provided with an air inlet valve 34, to allow housing 14 to be filled with compressed air. Housing 14 is pressure-tight up to a suitable internal operating pressure, when open end 17 is sealed by access flange 24 and wear element 16 is within lip seal 26, and housing 14 is filled with a compressed fluid, such as air, and here it should be understood that the term "fluid" refers to both gases and liquids. An internal operating air pressures of 20–100 psi has been found to be suitable, but higher or lower pressures may be appropriate, depending upon the desired scraping pressure The transverse dimensions A and B of storage chamber 18 are selected to be less than the length of wear element 16, so as to result in a relatively compact scraper capable of storing a relatively long wear element in a coiled fashion. In the preferred embodiment the inside surface of storage chamber 18 is cylindrical, in which case the aforesaid transverse dimensions A and B would of course represent the inside diameter of the cylinder, but housings having inside surfaces of non-cylindrical geometry could also be used.

In operation, conveyor scraper 10 is mounted in its working position adjacent conveyor belt 12, as shown in FIG. 2 (the arrow represents the direction of conveyor belt travel) such that wear element 16 extends across the width of the conveyor belt. Housing 14 is then pressurized by compressed air from an outside source, through a pressure regulating valve up to a suitable internal operating pressure (which as discussed above may 100 psi or more). A 100 psi pressure produces a force of up to 800 pounds on a $\frac{1}{4}$ by 32 inch wear element. The compressed air inside storage chamber 18 acts directly on the wear element so as to uncoil the wear element and to force it out of housing 14 and against the surface of conveyor belt 12. The pressure seal provided by lip seal 26 inside dispensing means 22 maintains the inside air pressure while at the same time allowing for movement of the wear element relative to the dispensing means 22 of the housing 14. As the wear element wears, the compressed air forces the coiled wear element to uncoil and its outside end to be urged against the conveyor belt, at an acceptably high relatively constant scraping pressure (the actual pressure being exerted by the wear element on the conveyor belt) throughout the lifetime of the wear element. For example, a suitable scraping pressure might be 60 psi, depending upon the material being conveyed, the speed of the belt, the angle of scraper contact, desired wear element lifetime and other factors.

Wear element 16 can be loaded into housing 14 in a number of ways. For example, wear element 16 could be manually loaded by removing access flange 24 and placing wear element 16 inside storage chamber 18 in a pre-coiled state, and then by feeding the outside end of wear element 16 into dispensing means 22 past seal 26. Alternatively, wear element 16 could be fed backwards through the slot in dispensing means 22 while housing 14 is unpressurized, and then coiled up upon itself, preferably by a mechanical loading device. A suitable loading device is an elongated bar, having a longitudinal slot for holding the inside end of wear element 16, and being provided at one end with a hand crank and at the other end with means for mating with a centering nipple or the like extending from the inside surface of closed end 15 of housing 14.

Figure 3:
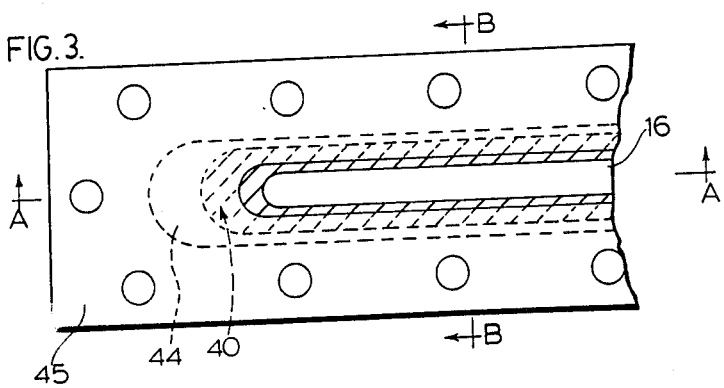
FIG. 3 is a top plan view of the sealing means of the presently preferred embodiment of the subject invention.
Figure 4:
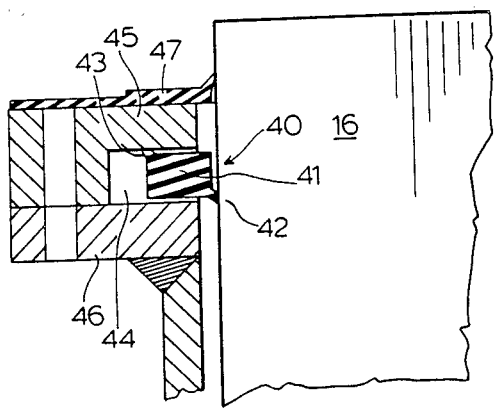
FIG. 4 is a sectional view taken along line A—A of FIG. 3.
Figure 5:
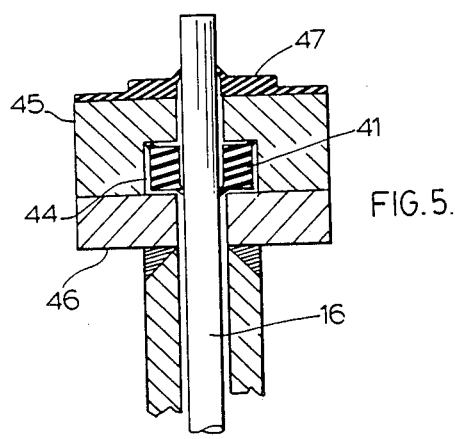
FIG. 5 is a sectional view taken along line B—B of FIG. 3.

FIGS. 3, 4 and 5 illustrate the presently preferred embodiment of the pressure sealing means of the present invention. Such pressure sealing means takes the form of floating double lip pressure sealing means 40, comprising seal body 41 and pressure lips 42 and 43. Body 41 is a continuous ring of a suitably rigid sealing material such as urethane, in the shape of an elongate oval conforming to the circumference of wear element 16. The cross-section of body 41 is dimensioned to be slidingly received within cavity 44 which is formed when seal retainer 45 is coupled to seal flange 46. In the embodiment illustrated, seal body 41 takes the form of a block of urethane, having lips 42 and 43 extending from diagonally opposed corners of the block. Lip 42 extends from the inside corner of body 41 proximate wear element 16 (i.e. the corner nearest storage chamber 18) and is formed to bear against the surface of wear element 16 when air or other fluid pressure is applied thereto. Similarly, lip 43 extends from the diagonally opposed corner of body 41 and is formed to bear against the portion of seal retainer 45 which forms the ceiling of cavity 44. Also shown in FIGS. 4 and 5 is dust seal 47, in the form of a resilient boot, which inhibits dust from coming in contact with pressure sealing means 40.

In operation, when storage chamber 18 is pressurized, pressurized air fills cavity 44, and air pressure forces lip 42 against wear element 16 and lip 43 against seal retainer 45, because the air pressure on the facing surfaces of lips 42, 43 is greater than on the opposing surfaces thereof, creating a pressure-tight seal. As wear element 16 expands and contracts in response to ambient temperature variations, double lip sealing means 40 "floats" with wear element 16, i.e. it moves in and out of cavity 44, all the while providing the requisite sealing action. Accordingly, the use of a floating seal such as sealing means 40 enables the conveyor scraper of the present invention to be used in conjunction with conveyors situated in environments which incur significant shifts in ambient temperature (e.g. ±50° F.) A floating seal such as sealing means 40 is necessary in such environments, since the coefficient of thermal expansion of urethane is much higher than that for steel, brass and other common metals, and the width of wear element 16, which is preferably made of urethane, will vary considerably, as temperature changes occur. However, since the thickness of wear element 16 is much less than its width, e.g. ½ inch compared to 32 inches, it is not necessary to adapt sealing means 40 to "float" any appreciable distance along the sides of wear element 16. Therefore, as best shown in FIG. 5, cavity 44 need not be as deep along the sides of wear element 16 as it is as the corners of wear element 16, and seal body 41 will be correspondingly reduced in depth.

Wear element 16 is preferably coated with a high viscosity lubricant as the wear element is being stored within housing 14, to reduce the internal drag pressure. Alternatively, the interior surface of storage chamber 18 could be provided with grooves or lands or other means for offsetting the wear element from the inside surface of the housing.

It should be appreciated that the use of a relatively long, coiled scraper blade drastically reduces wastage, compared to most prior art designs, which is a significant advantage of the present invention since polyurethanes are very expensive by volume. In the subject design, it is expected that less than two inches of a 118 inch scraper blade would be wasted, representing less than a two per cent wastage. Furthermore the compact design of the present invention enables the scraper to be mounted in conveyor chutes of limited dimensions, and at the same time, the high capacity of the conveyor scraper drastically reduces the labour cost involved in replacing the scraper blade, compared with prior art designs.

In an alternative embodiment, the wear element is made up of two layers of polyurethane having different wear characteristics. Since the scraping action occurs at the leading edge of the wear element, the leading edge is preferably made from a layer of polyurethane which is relatively hard, for resisting abrasion. The trailing edge of the wear element is preferably made from a relatively soft polyurethane, to remove the dirt and other particulate matter that gets past the hard leading edge, while at the same time providing support of a ridgidity sufficient to prevent excessive deflection of the thinner hard wearing element.

It will be apparent that while the preferred embodiment of the invention utilizes the pneumatic force created by compressed air, other gases could be used. Similarly, housing 14 could be filled with compressed water or other fluid, in which case the forces acting directly on the portion of the wear element coiled inside the housing would be hydraulic rather than pneumatic. It will also be appreciated that other pressure sealing arrangements could be used in place of lip seal 26, or floating seal 40, such as one or more O-rings. It should be clear as well that while the housing of the preferred embodiment has a storage chamber which is cylindrical in shape, storage chambers having other geometrical configurations could conceivably be used.

It will therefore be appreciated by those skilled in the art that while the subject invention has been described and illustrated with respect to various preferred and alternative embodiments, various modifications of these embodiments may be made without departing from the subject invention the scope of which is defined in the appended claims.

I claim:

1. Apparatus for removing particulate material from a conveyor belt, comprising:
   (a) a flexible wear element for bearing against the working surface of a moving conveyor belt and for removing particulate material therefrom;
   (b) a housing shaped and dimensioned for dispensing one end of the wear element against the conveyor belt and for storing the rest of the wear element in the interior of the housing, the transverse dimensions of the interior of the housing being less than the length of the wear element;
   (c) wherein the housing is pressure-tight up to a given operating pressure when the wear element is within the housing; and
   (d) wherein the housing is adapted to be filled by a fluid which when compressed acts directly on the wear element within the housing to force the wear element against the conveyor belt and to maintain the wear element against the conveyor belt as the wear element wears.

2. Apparatus as defined in claim 1, wherein the housing comprises dispensing means for dispensing the one end of the wear element against the conveyor belt and a storage chamber configured to store the rest of the wear element within the interior of the housing.

3. Apparatus as defined in claim 2, wherein the dispensing means includes sealing means for pressure sealing the interface between the interior of the housing and the wear element so that the interior of the housing is substantially pressure-tight up to a given operating pressure.

4. Apparatus as defined in claim 2, wherein the storage chamber is configured to store the wear element in a coiled fashion.

5. Apparatus as defined in claim 1, wherein the compressed fluid forces the wear element against the conveyor belt at a substantially constant belt pressure above a pre-selected minimum scraping pressure value.

6. Apparatus as defined in claim 5, wherein the pre-selected minimum scraping pressure value is above 20 psi.

7. Apparatus as defined in claim 1, wherein the interior of the housing is substantially cylindrical and the diameter of the interior of the housing is less than the length of an unused wear element.

8. Apparatus as defined in claim 1, wherein the fluid is a gas.

9. Apparatus as defined in claim 1, wherein the fluid is a liquid.

10. Apparatus as defined in claim 1, where the wear element has rounded corners.

11. Apparatus as defined in claim 3, wherein the sealing means comprises a lip seal having a body shaped to be secured to the dispensing means and a first lip shaped to bear against the periphery of the wear element in a pressure sealing fashion while providing for movement of the wear element relative to the dispensing means as the wear element wears.

12. Apparatus as defined in claim 11, where the lip seal comprises a second lip for bearing against the periphery of wear element so as to inhibit dust from contacting the first lip.

13. Apparatus as defined in claim 3, wherein the sealing means comprises floating sealing means adapted to move in conjunction with the wear element and to provide sealing action as the wear element expands and contracts with temperature variations.

14. Apparatus as defined in claim 13, wherein the floating sealing means comprises a double lip pressure seal having a body adapted to move freely within a seal cavity formed in a seal retaining portion of the dispensing means, a first pressure lip extending from the body and shaped to bear against the wear element in a pressure sealing fashion, and a second pressure lip extending from the body and shaped to bear against the ceiling of the seal cavity in a pressure sealing fashion.

15. Apparatus as defined in claim 14, wherein the cross-section of the body is generally block-shaped.

16. Apparatus as defined in claim 15, wherein the first pressure lip extends from a corner of the body nearest the storage chamber and the second pressure lip extends from a diagonally opposed corner of the body.

17. Apparatus as defined in claim 14, further comprising a dust seal for inhibiting dust from contacting the floating seal.

18. Apparatus as defined in claim 1, wherein the wear element comprises a leading edge layer made from a relatively hard material and a trailing edge layer made from a softer material.

19. Apparatus as defined in claim 2, wherein the storage chamber includes means for offsetting the wear element from the inside surface of the housing.

20. A conveyor scraper for removing material from a conveyor belt, comprising:
    (a) a flexible polyurethane wear element for bearing against the working surface of a moving conveyor belt and for removing material therefrom;
    (b) a housing having a cylindrical storage chamber of a length greater than the width of the wear element and a diameter substantially less than the length of the wear element when unused, wherein the wear element is stored in the storage portion so that it is coiled upon itself in a roll, and dispensing means for dispensing the wear element against the conveyor belt;
    (c) sealing means for sealing the interface between the dispensing means and the wear element so that the housing is made substantially pressure-tight up to a preselected operating pressure while allowing for movement of the wear element within the dispensing means of the housing; and
    (d) wherein the housing is adapted to be filled by gas which when compressed acts directly upon the wear element to force the wear element against the conveyor belt at a substantially constant pressure above a pre-specified minimum belt pressure value as the wear element wears during normal operating conditions.

* * * * *